METHOD AND APPARATUS FOR RECORDING AND TRANSMITTING INFORMATION USING PHOSPHORS

Filed May 27, 1954 6 Sheets-Sheet 1

Inventors
Jan A. Rajchman &
Humboldt W. Leverenz
By
C D Tuska
Attorney

April 17, 1956 J. A. RAJCHMAN ET AL 2,742,631

METHOD AND APPARATUS FOR RECORDING AND TRANSMITTING INFORMATION USING PHOSPHORS

Filed May 27, 1954 6 Sheets-Sheet 2

Inventors
Jan A. Rajchman &
Humboldt W. Leverenz

By
C D Tuska
Attorney

Inventors
Jan A. Rajchman &
Humboldt W. Leverenz
By
C D Tuska
Attorney

INVENTORS
JAN A. RAJCHMAN &
HUMBOLDT W. LEVERENZ
BY J. C. Whittaker
ATTORNEY

INVENTORS
JAN A. RAJCHMAN &
HUMBOLDT W. LEVERENZ
BY J. C. Whittaker
ATTORNEY

INVENTORS
JAN A. RAJCHMAN &
BY HUMBOLDT W. LEVERENZ
J. C. Whittaker
ATTORNEY

United States Patent Office 2,742,631
Patented Apr. 17, 1956

2,742,631

METHOD AND APPARATUS FOR RECORDING AND TRANSMITTING INFORMATION USING PHOSPHORS

Jan A. Rajchman and Humboldt W. Leverenz, Princeton, N. J., assignors to Radio Corporation of America, a corporation of Delaware Application May 27, 1954, Serial No. 432,666

8 Claims. (Cl. 340—173)

This application is a continuation-in-part of applications Serial No. 710,334, filed November 16, 1946, now abandoned; and Serial No. 197,968, filed November 28, 1950.

This invention relates to a novel method and apparatus for storing information on a phosphor layer, then reading it therefrom after a time interval.

It has been found desirable in many instances such as in certain types of communications systems and computers to record information at one convenient rate of speed, store it for a time interval, and then read it off at either the same or a different rate of speed. Heretofore, this has been done for short time intervals by electronic time delay circuits and for longer periods either with photographic film or magnetic recording tape or wire. All of these methods have certain advantages but they have some disadvantages as well. For example, the electronic circuit type is usually limited to relatively short time intervals. The photographic film method involves a relatively costly and time consuming development of the film. The magnetic tape or wire method has neither of the above disadvantages but is limited to use when the recording medium is in motion.

The improved method of the present invention has none of these disadvantages and is relatively simple in operation. It includes providing a substrate coated with a layer of a particular type of phosphor material which can be caused to store energy, when excited by energy of a shorter wavelength; and to release this energy in the form of energy of an intermediate wavelength when stimulated with energy of a longer wavelength. The substrate may be opaque, transparent or translucent; may be rigid or flexible; and may be in any geometric form, such as a tape, disc or a drum. The invention includes means and methods of placing information on a phosphor layer, including varying the excitation energy in accordance with variations in the information, and means and methods for releasing and detecting energy stored in the phosphor layer.

One object of the present invention is to provide improved methods and means for storing information.

Another object is to provide improved methods of and means for storing information and later detecting it.

Another object is to provide improved means for storing and subsequently detecting information using cathode ray tubes as the exciting and stimulating elements.

Another object is to provide improved means for storing and subsequently detecting information using a particular type of light shutter and steady light source as the exciter.

Another object is to provide improved methods of and means for placing information on a phosphor-coated substrate and detecting the information after a time interval with the aid of a photoelectric cell.

Another object is to provide methods of and means for placing information on a phosphor-coated substrate and then transferring it to a photographic film.

Another object is to provide improved methods of and means for recording information on a phosphor-coated tape in a number of distinct channels and reading the information off each channel after a period of time.

Another object is to provide improved methods of and means for recording information on a phosphor-coated drum in a number of distinct channels and reading the information off each channel after a period of time.

Another object is to provide improved methods of and means for recording information on a phosphor-coated disc in a number of distinct channels and reading the information off each channel after a period of time.

Still another object is to provide methods of and means for recording information on a phosphor-coating, detecting said information after a period of time and erasing the changes brought about in the phosphor so that the phosphor-coating may be re-used.

These and other objects will be more fully described in the following detailed description taken in connection with the drawings of which:

Similar reference characters have been used for similar elements throughout the drawings.

The invention may be conveniently described in connection with the recording of information obtained from an electronic computer. This computer may be any one of several types such as the Automatic Sequence Controlled Calculator described in Annals of the Computation Laboratory I, Harvard University Press, Cambridge, Massachusetts, or the computers known as the Edvac or Eniac. The latter is described in Mathematical Tables and Aids to Computation, volume II, No. 15, July 1946. Modifications of the output circuits of these instruments are necessary to cause them to feed their information into the exciting means used in the present invention and to synchronize all parts of the system.

Information received from a device such as an automatic telegraph printer may also be fed into the system, it being only necessary to synchronize the operation of the exciting element, the tape, and the printer.

In its simplest form of operation, a manual operator may press an on-off switch key causing current to flow in a recording circuit connected to the exciting means whenever the key is depressed.

Figure 1:
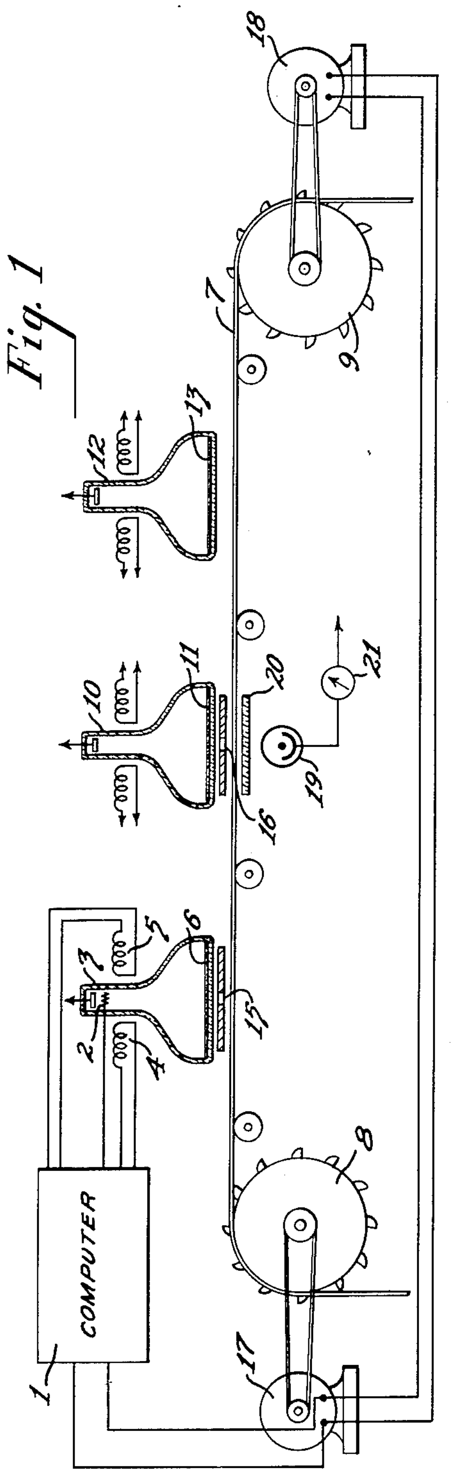
Figure 1 is a diagrammatic view of a first apparatus suitable for carrying out the method of the invention.

As shown in Figure 1, a computer 1 has its output connected to the grid 2 of a cathode ray tube 3 and the channel control, e. g., deflection coils 4 and 5 of the cathode ray tube, is also connected with the computer. This cathode ray tube may have its viewing screen coated with a phosphor material 6 which emits blue or one which emits ultraviolet radiations when bombarded with electrons. An example of a blue-emitting phosphor is ZnO activated with zinc. An example of an ultraviolet-emitting phosphor is aluminum oxide ($Al_2O_3$) which has been crystallized at about 1600° C. The blue light or ultraviolet radiation given off by the screen 6 of cathode ray tube 3 is used to excite a layer of phosphor material coated on a transparent or translucent tape 7 which is passed across the face of the tube by means of sprockets 8 and 9. The tape may be of cellulose acetate or cellulose nitrate or other transparent or translucent flexible film forming material.

The phosphor material coated on the tape is preferably of a material which emits green to orange light of very short persistence when excited with blue or ultraviolet radiations of less than 5000 A wavelength but more generally it may be of a type which emits somewhere between the wavelengths of excitation and subsequent stimulation. When this material is subsequently stimulated with say infra-red light of 8000 to 16000 A, it again emits orange light of about 6000 A or orange to green light, for example. In the figure, the phosphor-coated tape is shown as passing across the face of a second cathode ray tube 10 having a phosphor layer 11, coated on its face, which emits infra-red radiations when bombarded with a stream of electrons. This infra-red-emitting phosphor may be composed of zinc and cadmium sulfides, predominantly CdS, activated with small amounts of copper. Such a phosphor may have its peak emission at about 10,000 A. The phosphor coated on the tape will not emit visible light when stimulated with the infra-red radiations unless it is previously excited or "primed" with the blue or ultraviolet.

The phosphor-coated tape is next shown passing beneath the face of a cathode ray tube 12 having its viewing screen coated with a phosphor 13 which emits orange light, or, more generally, light of a wavelength intermediate and partially overlapping the emission and stimulation bands, when bombarded with a stream of electrons. This phosphor may be an antimony-activated magnesium sulphide or a combination of zinc and cadmium sulfo-selenides activated with either copper or silver, the preparation of which is illustrated in the application of H. W. Leverenz, Serial No. 678,539, filed June 22, 1946 and now Patent No. 2,505,621. When the phosphor on the tape is irradiated by the quenching, e. g., orange, light given off by the screen of cathode ray tube 12, its luminescence is effectively erased and it is ready to be used over again.

Figure 2:
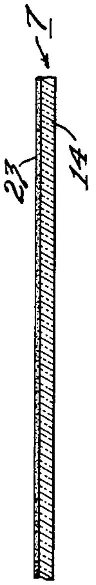
Figure 2 is an enlarged cross section view of a part of one type of coated tape used in the invention.

Figure 2 is an enlarged cross section view of a section of the phosphor-coated tape 7 having the coating of phosphor 23 placed on the backing material 14, exaggerated in thickness. Examples of the phosphor with which this tape is coated and which have the unusual properties described above are manganese-activated zinc-beryllium stannogermanate or copper-lead-activated zinc sulfide or preferably a double-rare-earth-activated alkaline-earth sulfide or sulfide-selenide. One example of this type of phosphor is strontium sulfide activated with europium and samarium. Another example is strontium sulfide-strontium selenide activated with europium and samarium. In either of these, the europium activator may be replaced in whole or in part by cerium and the samarium may be similarly replaced by terbium. A quantity of the phosphor in the form of fine crystalline powder may be incorporated in a cellulosic or other non-hygroscopic lacquer, such as one containing other synthetic resinous materials, including the silicones, and sprayed on the cellulose derivative tape as a thin, uniform layer.

For the preparation of any of the phosphor materials mentioned above except the copper or silver-activated cadmium sulfo-selenides, reference may be had to PB–25481, publication board, Department of Commerce, Washington, D. C.

Figure 3:
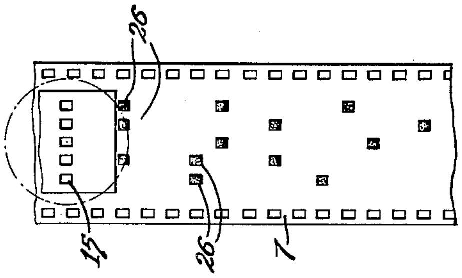
Figure 3 is a detail view showing a type of aperture which may be used in the apparatus of Figure 1.

It is desired to have the information recorded on the tape in a number of narrow channels as shown in Figure 3. In order to confine each "pulse" of information to a small area in a particular channel, a narrow transverse aperture 15, having as many openings as there are channels desired on the tape, is placed across the face of the recording tube 3. A similar aperture 16 is also placed across the screen of the "reading" tube 10. Alternately, the channel may be selected by electronic control of the magnitude of electron beam deflection perpendicular to the path of the tape.

The operation of the system is as follows: information in the form of pulses or modulated waves of electrical energy is received from the output of the computer 1 and impressed on the grid 2 of cathode ray tube 3. This cathode ray tube is provided with a single sweep circuit represented by deflecting coils 4 and 5, which cause the beam to be deflected in a direction transverse to the direction of motion of the tape. These deflecting coils are connected to the output of the computer and are synchronized therewith so that as each item of information is received from the computer, it is recorded on a particular channel of the phosphor coating of the tape 7. The tape may be moved past the aperture 14 intermittently as in a motion picture projector and the electron beam of the cathode ray tube 3 may then scan the width of the tape once during each step. But where the motion of the tape is relatively slow compared to the speed of scanning, a stepwise motion is not necessary. The film is driven through sprockets 8 and 9 by means of motors 17 and 18, respectively, which are also synchronized with the output of the computer. When the computer is not in operation, the motors do not run and, as a result, the tape is also motionless. The electrical signal obtained from the computer may merely vary abruptly in time between two values such as "on" and "off." For the "off" condition, the cathode ray tube may produce a beam of electrons exciting or priming a spot on a particular channel of the recording tape 7 as it does so. For the "on" condition, the beam of electrons may be cut off, thus leaving an unactivated spot on the tape. This action may be reversed with the "off" condition being represented by an unactivated area and the "on" position by an activated area. When the stream of electrons is striking the screen 6, blue or ultra-violet radiations, as the case may be, are given off. These radiations, in turn, excite the phosphor coating on the tape, causing it to give off its characteristic luminescence, e. g., orange to green light, momentarily, and storing up further energy, which is later to be released. Excited areas on the recording tape made as above described are illustrated by the darkened spots 26 shown in Fig. 3.

The phosphor-coated tape, with the information thus recorded on it, passes on to the second, or stimulating tube 10 where the recorded information is to be read from it. If the tape is kept enclosed so that no external light can impinge upon it and if ordinary temperatures are maintained, the tape may be stored indefinitely before being passed to the reading station. At this station, a cathode ray tube is kept in operation continuously, whenever the tape is in motion. A stream of electrons is thus sweeping continuously back and forth within the path defined by the aperture 16, causing infra-red radiations to be given off by the layer of phosphor 11. Those spots 26 on the tape 7 which have been previously activated by the tube 3 will now emit the same characteristic luminescence, e. g., within the green to orange band, while the areas not so activated will remain dark. The luminescence emitted by the tape is here defined as falling anywhere within the visible or near-visible spectrum and, according to present concept, will be not more than an octave removed from either end of the wavelength limits of human vision. The emitted luminescence may either simply be observed visually, if of the proper wavelength for such observation, or it may be picked up by reading tube which may be photocell 19 such as a multiplier tube after first passing through a suitable filter 20. Current corresponding to the light impulses received by the phototube may be indicated on the microammeter 21 or amplified and passed into a recorder to be permanently recorded on another tape, or displayed on a cathode ray tube, or fed back to the computer.

Instead of a single photocell and amplifier being used to detect the luminous areas on the phosphor-coating of the tape, there may be used as many detector units as there are information channels on the tape. This is possible if very small prisms are used to separate the light coming from each channel and to direct it to a separate photocell. With this arrangement, there may be used any combination of activated areas on a single transverse strip of the coated tape to convey information of a complex nature received from the computer 1 or equivalent device.

The phosphor-coated tape 7 with its unactivated and activated areas next passes beneath the screen of tube 12 which is being swept with a stream of electrons causing the layer of phosphor 13 to give off quenching orange light (or, more generally, light intermediate the emission and stimulation bands of the phosphor) which erases all activated spots on the phosphor coating of the tape. The tape is thus made ready to be used over again.

Figure 4:
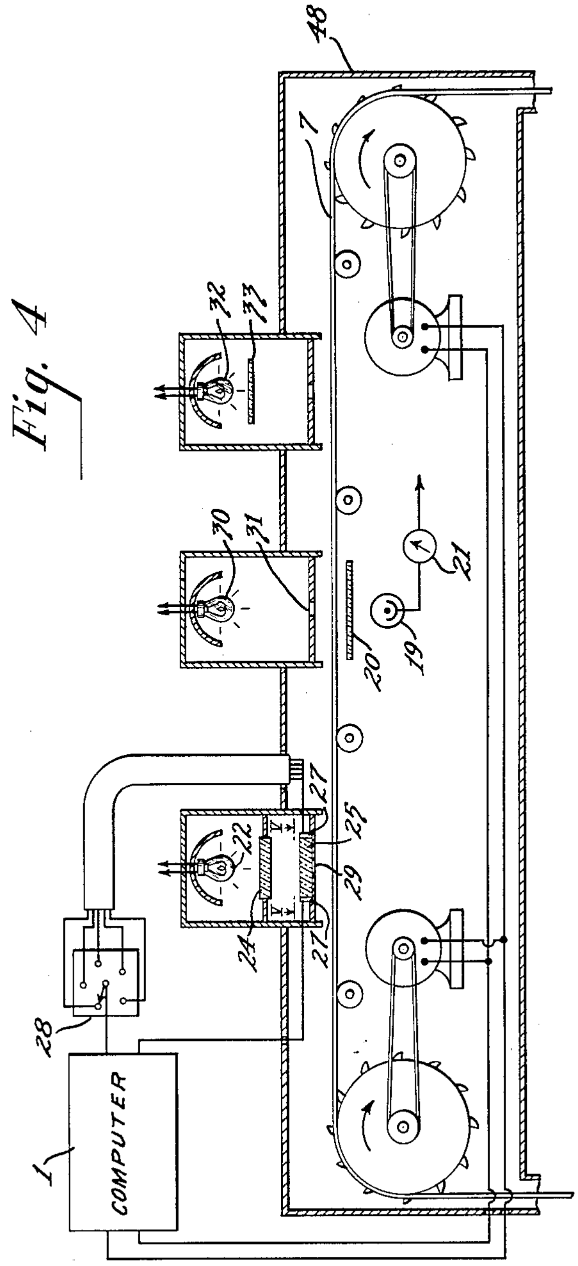
Figure 4 is a diagrammatic view of a second apparatus which may be used in carrying out the method.
Figure 5:
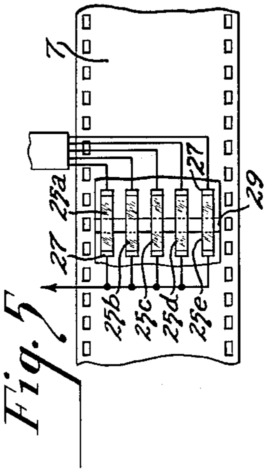
Figure 5 is a detail plan view showing a crystal polarizer used in the apparatus of Figure 4.

Alternate methods of irradiating the tape, with the various wavelengths of light used in the process, may be utilized. One of these alternate forms is illustrated in Figs. 4 and 5. As in the previous example, the tape 7, coated with a suitable layer of phosphor material, as previously described, is passed beneath an exciting means for impinging blue or ultraviolet radiations on selected areas of the tape. This means may consist of a source of the radiations 22 such as a high voltage mercury vapor tube having substantially steady illumination. Radiations from this source are passed through a light shutter. This shutter comprises two polarizers, one of which may be a polarizing material such as a nicol prism or a sheet of Polaroid 24 and the other of which may be a battery of electrooptically-active crystals 25. Polaroid is a sheet of polarizing material usually comprising oriented crystals of the hydriodic acid salt of quinine sulfate embedded in a transparent plastic. The crystal polarizer may have a plurality of compartments corresponding in number and position to the number of channels desired on the tape 7. Each compartment is composed of an electrooptically crystal 25 (a–e) of a material such as di-hydrogen ammonium phosphate, di-hydrogen potassium phosphate, cubic zinc sulfide, or quartz, any of which has the property of rotating its plane of polarization of light when a suitable potential is applied to opposite crystal faces. The potential may be applied to the crystal in each compartment by means of suitable electrodes 27, which may be silver coatings, connected to the output of the computer 1 through a rotary selector switch 28. This switch is synchronized with the output of the computer and in order to have sufficiently rapid operation, it is preferably electronic such as that described in U. S. Patent 2,146,862. The Polaroid and the crystal serve as the two elements of the polarizer which can be used to cut off or pass a beam of light when suitably oriented with respect to each other. The two polarizers may be normally set so that their axes of transmisison are crossed at right angles to each other. Under this condition, light is extinguished. Then, when a signal is received from the computer, a potential may be caused to be applied to one of the crystals as **25*a* through its electrodes 27 rotating its plane of polarization such that it passes light from the source 22 through the aperture 29** for an instant and causes a small area on the corresponding channel of the tape to be excited. Subsequent signals received from the computer are passed to the same or other crystals and spots are excited in the corresponding channels of the tape. As in the previous example, operation of the tape may be continuous or intermittent.

The phosphor-coated tape normally travels in the direction shown by the arrow in Fig. 4, although it may also be made to operate in the reverse direction, and the excited areas are successively brought beneath the source of infra-red radiations 30. Whenever an excited areas passes beneath the narrow beam of light, issuing from the source 30, which is allowed to pass by the aperture 31, luminescence is given off which impinges on the photocell 19 as in the previous example. The excited areas may be erased by passing the phosphor coating of the tape beneath a source of quenching light 32, which should be of somewhat longer wavelength than the light emitted by the phosphor on the tape. The wavelength of the quenching radiations may be controlled by placing a filter 33 in the path of the beam. If it is desired to record separately the information from each channel of the phosphor-coated tape, individual photocells may be provided for each one.

Still another method of recording information on the tape is to excite selected areas directly with a modulated stream of electrons. This can be accomplished using a cathode ray tube having a very thin window, commonly known as a Lenard Window, which allows passage of high velocity electrons. The electrons strike the phosphor material and activate it, causing it to store up energy which may later be released as previously described.

Figure 6:
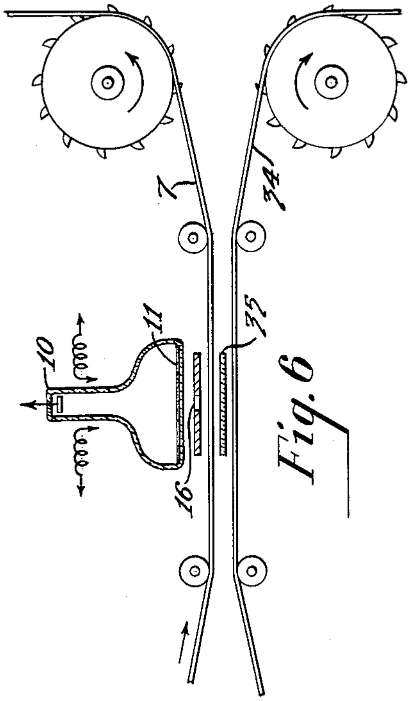
Figure 6 is a diagrammatic view of an alternate form of detector and duplicating mechanism which may be used in the method.

After the information has been recorded on the phosphor-coated tape, as shown in any of the examples, or by some other method, it may be permanently recorded on photographic film, if desired. In Fig. 6, the phosphor-coated tape 7 is shown coming from a recording station where it has been excited with blue or ultraviolet light. It is passed across the screen of a cathode ray tube 10, as illustrated also in Fig. 1, having its face coated with a phosphor 11 which emits infra-red radiations when bombarded with a stream of electrons. The infra-red radiations passing through the aperture 16 strike the phosphor-coating of the tape and cause those areas which have been previously excited to luminesce. The luminous areas are recorded on the photographic film 34 which is subsequently developed to form a permanent record. An infra-red opaque filter 35 may be used to prevent stray infra-red radiations from reaching the film if it is sensitive to these radiations.

Figure 7:
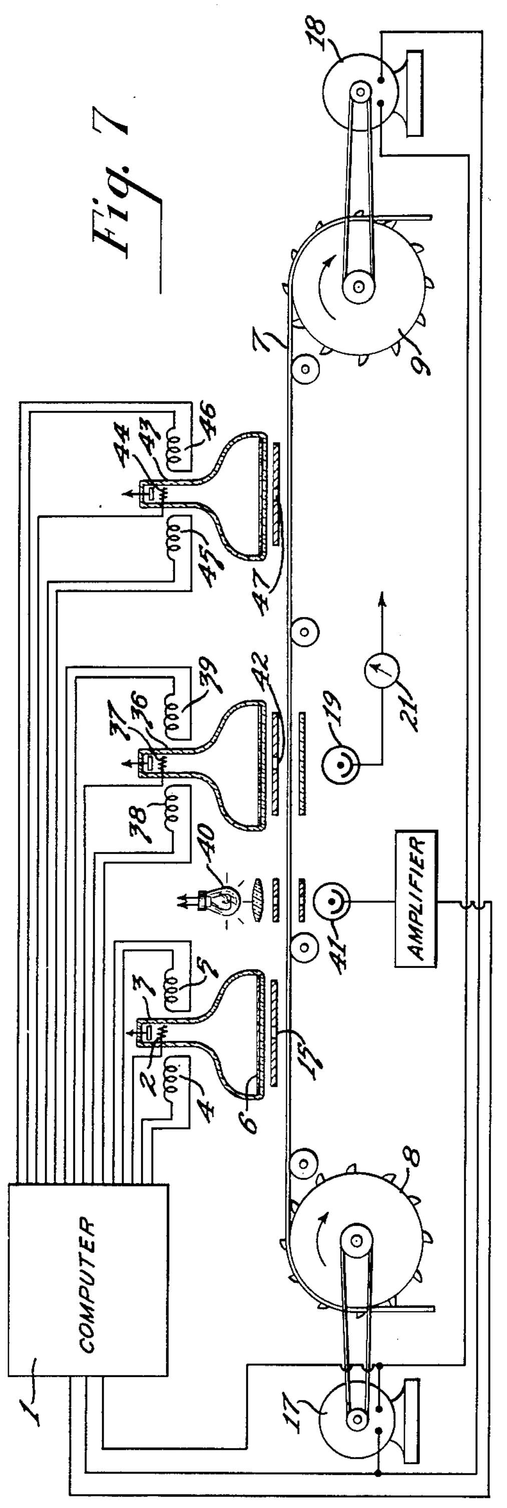
Figure 7 is a modification of the apparatus of Figure 1 having more refined controls.

A more complex method of operation, with more refinements, which allows the phosphor-coated tape to be used more often before replacement, is illustrated in Fig. 7. In this modification, the information is put on the phosphor-coating of the tape as in the example of Fig. 1. The stimulating tube 36, however, in this case, has its grid 37 and deflecting coils 38 and 39 synchronized with the computer 1 so that the electron beam is turned on only when an information area, excited or non-excited, is within the aperture and at the channel position presently being scanned by the beam. The memory device of the computer may include a counter actuated by an observing mechanism comprising a light source 40 which projects a narrow beam of light through a single sprocket hole of tape 7 impinging on a photocell 41. The number of sprocket holes or any other permanent identifying marks passing by are thus counted and the computer, causing the reading tube 36 to "look for" an information area of the tape at the proper instant when said area appears within the aperture 42 and in a particular channel.

Since the stimulation of the phosphor coating of tape 7 is confined only to the information areas, the intermediate areas between information areas are rested and the phosphor coating lasts much longer. In a similar manner, the erasing tube 43 can be made to throw quenching light only on the information areas instead of on the entire tape as in the previous examples. The grid 44 of this tube is synchronized with the output of the computer as are also the deflection coils 45 and 46. Aperture 47 constructed similarly to aperture 15 of tube 3 confines the irradiating energy to the discrete areas of the tape which it is desired to quench. The tubes may be synchronized to operate upon every information area or upon a preselected sequence of areas and channels according to a program inserted into the computer.

Figure 9:
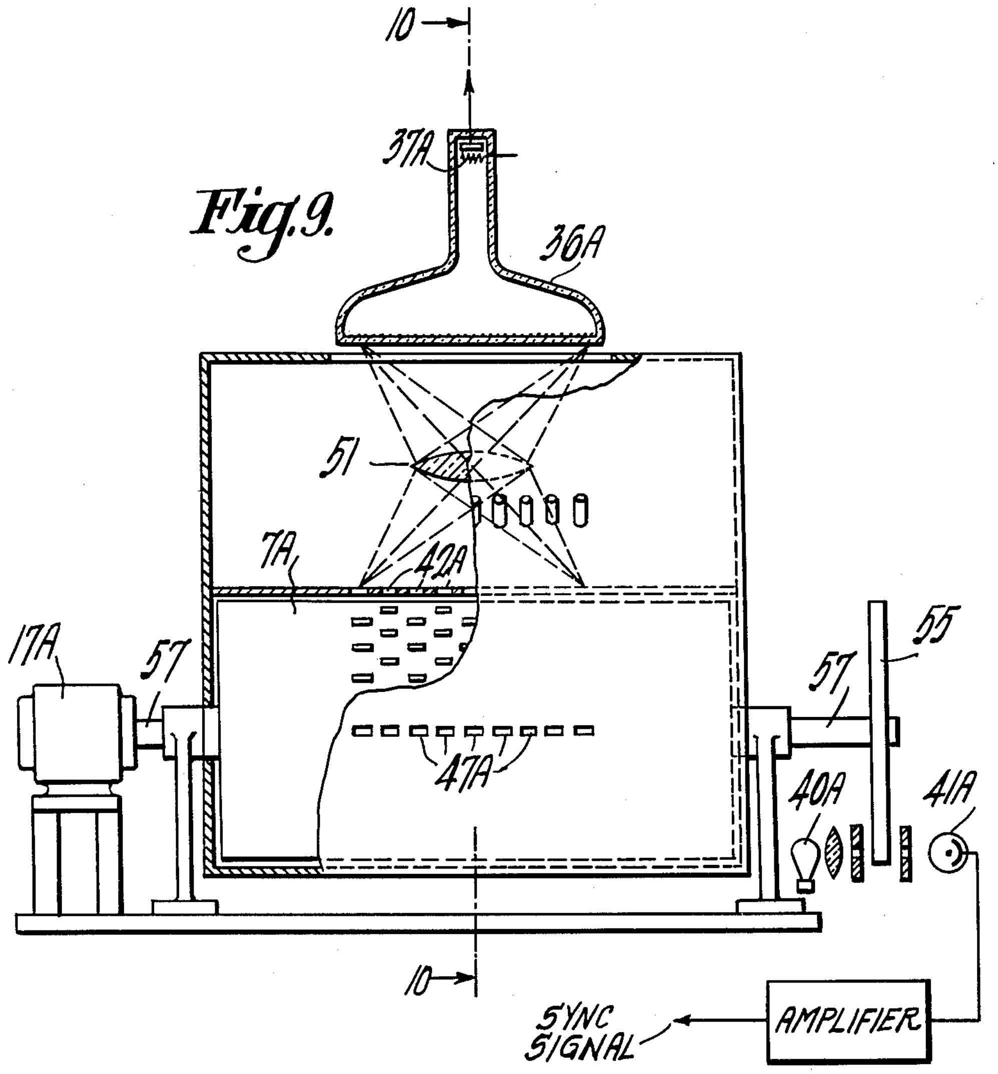
Figure 9 is a partially-sectional, partially schematic front elevational view of a third apparatus suitable for carrying out the invention.
Figure 10:
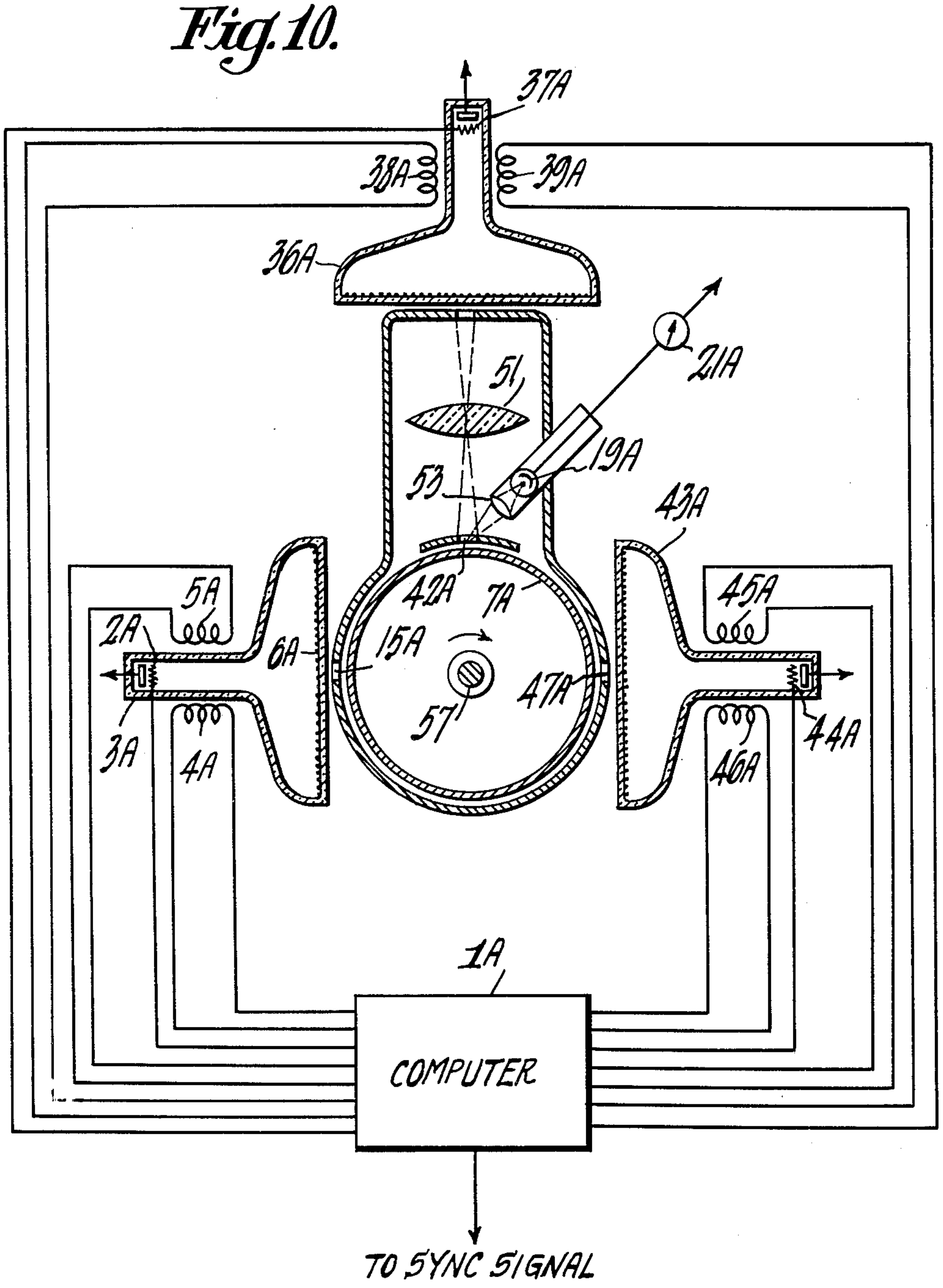
Figure 10 is a partially-sectional, partially-schematic side elevational view of the apparatus of Figure 9 taken along section lines 10—10.

Referring to Figures 9 and 10, the method of the invention may be carried out in an apparatus comprising an opaque drum or cylinder 7A having a coating of one of the above-described phosphors on its outer surface. A writing tube 3A, a stimulating tube 36A and an erasing tube 43A are spaced around the periphery of the drum 7A such that, as the drum rotates, each incremental area on the drum surface will first pass under the writing tube 3A, the stimulating tube 36A and then the erasing tube 43A. The drum 7A is mounted on a shaft 57 driven by a motor 17A.

In operation, the information is put on the phosphor coating of the drum by a method similar to the method used to put the information on the phosphor coating of the tape in the example of Figure 7. The information is put on the phosphor coating by the writing tube 3A. As the drum 7A rotates, the information areas pass under the apertures 42A below the stimulating tube 36A. The stimulating tube 36A is operated by a method similar to the stimulating tube 36 of Figure 7. However, the light emitted by the stimulating tube 36A is made to pass through an optical system, including a lens 51, and then focused upon the apertures 42A of the desired channel. The light emitted by the stimulated phosphor in the excited areas of the drum surface is collected by a second optical system including a lens 53 and focused upon a photocell 19A for each channel. The photocell 19A thereby provides the information from each channel in the form of electrical impulses.

As the drum 7A continues to rotate, the information areas pass under the apertures 47A of the erasing tube 43A. The erasing tube 43A is operated by a method similar to the operation of the erasing tube 43 of Figure 7.

A disc 55 bearing synchronizing marks, holes or other indicia, may be attached to the shaft 57. The writing tube 3A, the reading tube 36A and the erasing tube 43A may be synchronized with the computer 1 so that only preselected information areas are read and erased by a method similar to the method described in the example of Figure 7. The synchronization system may include a light source 40A which projects a narrow beam of light through a synchronizing mark on the disc 55 impinging upon a photocell 41A.

While Figures 9 and 10 have been described for an opaque drum, a transparent or translucent drum may be used. If a transparent or translucent drum is used, the apparatus according to Figure 9 may be used, or the stimulating tube 36A and the photocell 19A may be placed on opposite sides of the phosphor coating and operated by a method similar to the method described for the apparatus of Figure 7.

Figure 11:
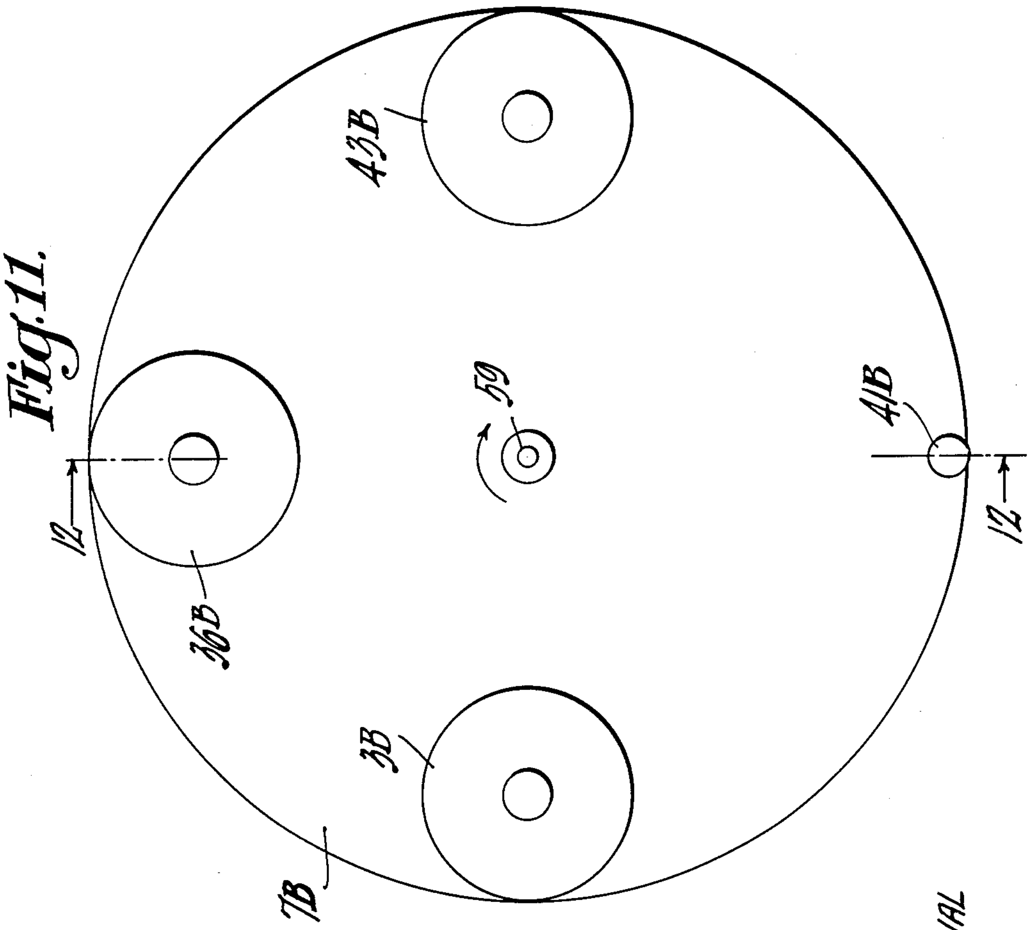
Figure 11 is a partial elevational view of a fourth apparatus suitable for carrying out the invention, illustrating the arrangement of the principal elements of the apparatus.
Figure 12:
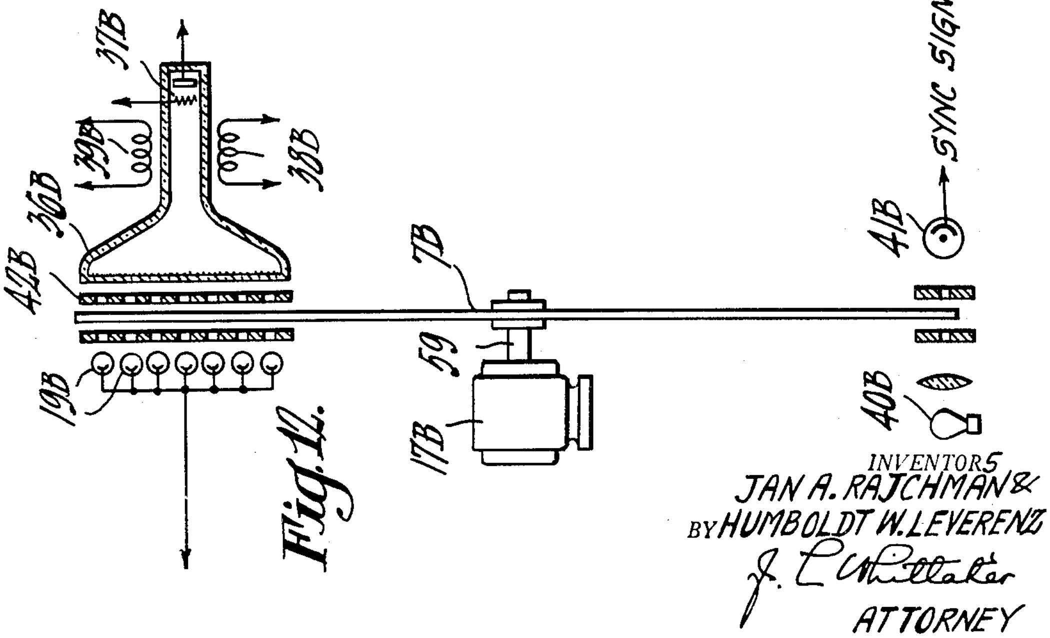
Figure 12 is a partially-sectional, partially-schematic side elevational view of the apparatus of Figure 11, taken along section lines 12—12.

Referring to Figures 11 and 12, the method of the invention may be carried out in an apparatus comprising a transparent or translucent disc 7B, having a coating of one of the above-described phosphors upon one surface. A writing tube 3B, a stimulating tube 36B and an erasing tube 43B are spaced around the axis of rotation of the disc 7B, such that, as the disc rotates, each incremental area of the disc surface will first pass under the writing tube 3B, the stimulating tube 36B and then the erasing tube 3B. The tubes are shown spaced 90° apart; however, they may be spaced as close or as far apart as desired so long as the incremental areas pass under these tubes in the desired order. The disc 7B is mounted on a shaft 59, driven by a motor 17B.

In operation the information is put on the phosphor coating of the disc 7B by a method similar to the method used to put the information on the phosphor coating of the tape in the example of Figure 7. The information is put on the phosphor coating by the writing tube 3B. As the disc 7B rotates, the information areas pass under the apertures 42B below the stimulating tube 36B. The stimulating tube 36B is operated by a method similar to the stimulating tube 36 of Figure 7. The light emitted by the stimulated phosphor in the excited areas of the disc surface is collected upon a photocell 19B for each channel. The photocell 19B converts the information in the form of light from each channel to electrical signals.

As the disc 7B continues to rotate, the information areas pass under the apertures 47B of the erasing tube 43B. The erasing tube 43B is operated by a method similar to the operation of the erasing tube 43 of Figure 7.

The disc 7B may bear synchronizing, marks, holes or other indicia along the surface of its outer periphery. The writing tube 3B, the stimulating tube 36B and the erasing tube 43B may be synchronized with the computer so that only preselected information areas are read and erased by a method similar to the method described in the example of Figure 7. The synchronization system may include a light source 40B which projects a narrow beam of light through a synchronizing mark on the disc 7B impinging upon a photocell 41B.

While Figures 11 and 12 have been described for a translucent or transparent disc, an opaque disc may also be used. If an opaque disc is used, the apparatus according to Figures 11 and 12 may be used except that the reading tube 36B and the photocell 19B should be placed on the same side of the phosphor coating and operated by a method similar to the method described for the apparatus of Figures 9 and 10.

The transparent or translucent tape 7 of Figures 1, 4 and 7 may be replaced with an opaque tape. However, the stimulating tube and photocell would necessarily be arranged in a manner similar to that shown in Figures 9 and 10.

Although the process has been illustrated as recording only "on" "off" conditions of a signal received from a computer, it may be used to record various strengths of signal where the strength of the priming radiations can be varied as in the first method illustrated. The amount of energy which the phosphor layer will store is directly proportional to the intensity of the blue or ultraviolet radiations.

It is not necessary that the exciting radiations be within the blue or ultraviolet band or that the subsequent stimulation be with infra-red radiations. It is necessary only that the stimulating radiations be substantially longer in wavelength than the recording radiations and that the wavelength of radiations emitted by the luminescent material be intermediate the two.

For example, the phosphor coated on the substrate may be cubic KCl:Ag which can be excited by wavelengths of less than 2000 A and which emits in a band near 2720 A when stimulated by wavelengths in a band peaked near 4200 A. The phosphor coated on the substrate may also be any of cubic NaCl:Ag: cubic NaCl:Cu, or cubic KCl:Cu. All of these phosphors, which have properties similar to cubic KCl:Ag, are described by M. Kato, in "Spectroscopic Investigations of Optically Homogeneous Luminescent Substances," Scientific Papers Inst. Physical Chemistry Research (Tokyo), vol. 41, 113–160, 1943, and vol. 42, 35–48, 95–107, 1944.

When the phosphor is of the type described in the preceding paragraph, the exciting radiations may be generated by emission from aluminum oxide phosphor crystallized at about 1600° C., which has substantial emission below 2000 A when excited with cathode rays. The stimulation radiation may be produced by cathode ray excitation of hexagonal ZnS:Ag or of calcium tungstate phosphor. The luminescence of the phosphor may then be quenched with emission from $BaSO_4$:Pb or $Ca_3(PO_4)_2$:Ce phosphors. These are but typical examples of many which could be used for the same purposes.

Figure 8:
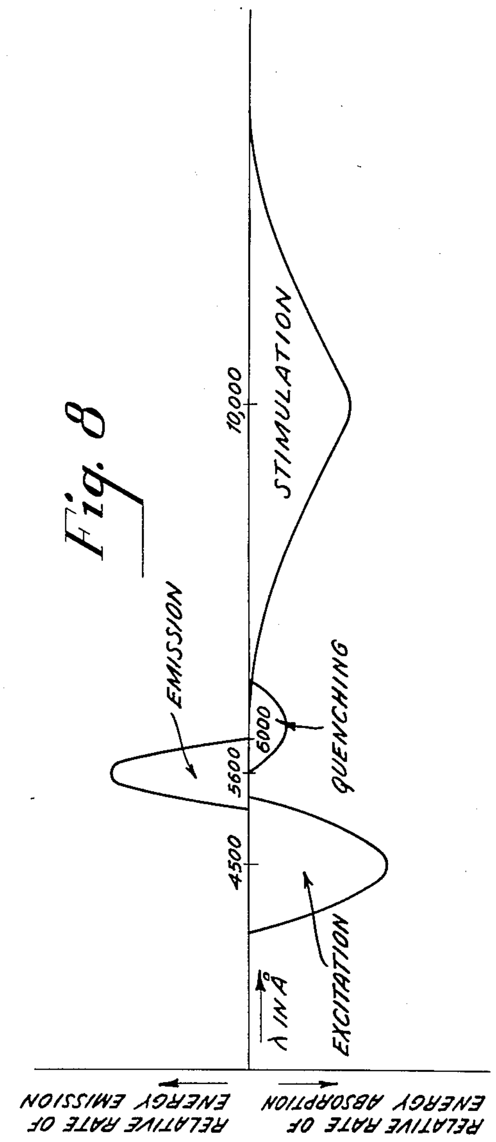
Figure 8 is a graph illustrating the relative positions of the wavebands of the energy used in different steps of the process.

The general relationship between the wavelength bands of energy of excitation, emission, quenching, and stimulation are illustrated in Figure 8. The figure also indicates the preferred center or peak of each band although the bandwidths indicated are not intended to be exact or limiting.

The phosphor layer should be screened from all extraneous light not being used for activation purposes. Hence, the apparatus should be enclosed in a light-tight cabinet. This has been illustrated only in the case of Figure 4 where a jacket 48 is shown enclosing the apparatus.

The principal advantage derived from using an information storage method, such as that which has been described, to store information received from, or to be used in, a computer, is the large variation in speed possible between putting the information on the tape and, thereafter, reading it off again. Information to be used by the machine may be put on at a slow rate of speed by the operator and picked off very rapidly by the machine. Or information may come from a computer very rapidly and he read off by an observer at a more leisurely pace. A phosphor layer with information recorded and detected, as described, may also be used to transmit messages rapidly through space and also to receive them at the other end of the line. Another application is in the matching of speeds of manual operators and mechanical devices in general with that of electronic devices as in automatic telegraph systems.

Other equivalent excitation, stimulation and quenching radiation sources may be substituted for those described. Other recording means such as the well-known General Electric or Brown recorders, teletype machines, and facsimile, may be used to make a permanent record of the information placed on the phosphor layer.

There has thus been described methods of and apparatus for recording and storing information in a manner having great flexibility and many practical applications.

What is claimed is:

1. In apparatus for recording information received from a first source in the form of electrical current variations, said apparatus comprising a second source of radiations having emission within a range of relatively short waveleigths, means for modulating said radiations with said current variations, a phosphor-coated substrate positioned so the phosphor coating is responsive to said modulated radiations, the phosphor being of a type which stores energy when excited with said short wavelength radiations and is later able to emit radiations of intermediate wavelength when stimulated with radiations of wavelength longer than said intermediate wavelength, means for applying radiations from said second source to said phosphor coating and means for subsequently applying to said phosphor coating radiations of said longer wavelength, the improvement consisting of means for applying radiations from said second source in the form of pulses, and means for directing each of said pulses to one of a plurality of longitudinal channels arranged in parallel relation across said phosphor coating.

2. Apparatus according to claim 1 in which said second source of radiations comprises a phosphor layer, and means for producing an electron beam for exciting said phosphor coating.

3. Apparatus according to claim 1 in which said second source of radiations comprises a mercury vapor lamp and said modulating means comprises a shutter for permitting the passage of varying amounts of light from the lamp to said phosphor coating.

4. Apparatus according to claim 2 in which said second source of radiations comprises a mercury vapor lamp and said modulating means includes a pair of polarizing elements, one of said elements including a crystal body exhibiting an electrooptical effect, and means for applying to said crystal a potential varying in magnitude proportional to said electrical current variations.

5. In apparatus for recording information received from a first source in the form of electrical current variations, said apparatus comprising a second source of radiations having emission within a range of relatively short wavelengths, means for modulating said radiations with said current variations, a phosphor-coated tape positioned so the phosphor coating is responsive to said modulated radiations, the phosphor being of a type which stores energy when excited with said short wavelength radiations and is later able to emit radiations of intermediate wavelength when stimulated with radiations of wavelength longer than said intermediate wavelength, means for applying radiations from said second source to said phosphor coating and means for subsequently applying to said phosphor coating radiations of said longer wavelength, the improvement consisting of means for applying radiations from said second source in the form of pulses, and means for directing each of said pulses to one of a plurality of longitudinal channels arranged in parallel relation across said phosphor coating.

6. In apparatus for recording information from a first source in the form of electrical current variations, said apparatus comprising a second source of radiations having a peak emission within a range of relatively short wavelengths, means for modulating said radiations with said current variations, a phosphor-coated tape having portions for information areas positioned so the phosphor coating is responsive to said modulated radiations, the phosphor being of a type which stores energy when excited with radiations within said range of relatively short wavelengths and is later able to emit radiations of intermediate wavelength when stimulated with radiations of wavelength longer than said intermediate wavelength, means for applying radiations from said second source to said portions of said phosphor coating, a normally turned off third source of radiations of said longer wavelength, and means for moving said portions of said phosphor coating subjected to radiations from said second source into the path of radiations from said third source, the improvement comprising means for applying radiations from said second source in the form of pulses, means for directing each of said pulses to one of a plurality of longitudinal channels arranged in parallel relation across said phosphor coating, and means for turning on said third source only when an information area of said phosphor coating is present in the path of the radiations therefrom.

7. In apparatus for recording information from a first source in the form of electrical current variations, said apparatus comprising a second source of radiations having a peak emission within a range of relatively short wavelengths, means for modulating said radiations with said current variations, a phosphor-coated substrate having portions for information areas positioned so the phosphor coating is responsive to said modulated radiations, the phosphor being of a type which stores energy when excited with radiations within said range of relatively short wavelengths and is later able to emit radiations of intermediate wavelength when stimulated with radiations of wavelength longer than said intermediate wavelength, means for applying radiations from said second source to said portions of said phosphor coating, a normally turned off third source of radiations of said longer wavelength, and means for moving said portions of said phosphor coating subjected to radiations from said second source into the path of radiations from said third source, the improvement comprising means for applying radiations from said second source in the form of pulses, means for directing each of said pulses to one of a plurality of longitudinal channels arranged in parallel relation across said phosphor coating, and means for turning on said third source only when an information area of said phosphor coating is present in the path of the radiations therefrom.

8. In apparatus for recording information received in the form of electrical current variations, comprising a cathode ray tube having a grid connected to receive said current variations and a screen coated with a phosphor having peak emission within a range of relatively short wavelengths, means for generating a beam of electrons within said tube, a transparent tape having coated thereon a phosphor adapted to be excited by radiations within said range of relatively short wavelengths and having the property of storing the energy of excitation which may be later released in the form of radiations of intermediate wavelength when stimulated with radiations of wavelength longer than said intermediate wavelength, said phosphor coating being positioned to receive radiations from said cathode ray tube screen, means for confining the band of application of said radiations to a narrow strip of said phosphor coating at any one instant, and means for moving said phosphor coating past said confining means, the improvement consisting of a second cathode ray tube positioned at any other desired point along the path of said phosphor coating in the direction of its motion, said screen being coated with a phosphor capable of emission of said longer wavelength radiations, means for generating a beam of electrons within said second tube, and means for confining radiations from said second tube to a narrow band running transverse to the direction of motion of said phosphor coating.

References Cited in the file of this patent

UNITED STATES PATENTS 2,596,741 Tyler et al. ............ May 13, 1952

OTHER REFERENCES

Proc. of a Symposium on Large-Scale Digital Calculating Mach., Harvard University, 1947, vol. XVI, pp. 146–150.